(12) United States Patent
Kwon

(10) Patent No.: US 9,832,321 B2
(45) Date of Patent: *Nov. 28, 2017

(54) METHOD FOR COLLECT CALL SERVICE BASED ON VOIP TECHNOLOGY AND SYSTEM THEREOF

(71) Applicant: Ey-Taeg Kwon, Seoul (KR)

(72) Inventor: Ey-Taeg Kwon, Seoul (KR)

(*) Notice: Subject to any disclaimer, the term of this patent is extended or adjusted under 35 U.S.C. 154(b) by 257 days.

This patent is subject to a terminal disclaimer.

(21) Appl. No.: 13/907,950

(22) Filed: Jun. 2, 2013

(65) Prior Publication Data

US 2014/0153446 A1 Jun. 5, 2014

Related U.S. Application Data

(63) Continuation of application No. 12/969,068, filed on Dec. 15, 2010, now Pat. No. 8,477,766, which is a
(Continued)

(30) Foreign Application Priority Data

May 12, 2003 (KR) .................. 10-2003-0029927
Nov. 14, 2003 (KR) .................. 10-2002-0070751

(51) Int. Cl.
*H04L 12/66* (2006.01)
*H04M 15/08* (2006.01)
(Continued)

(52) U.S. Cl.
CPC ........... *H04M 15/08* (2013.01); *H04M 15/00* (2013.01); *H04M 7/1205* (2013.01); *H04M 2215/62* (2013.01)

(58) Field of Classification Search
CPC .... H04M 7/1205; H04M 15/00; H04M 15/08; H04M 2215/62
(Continued)

(56) References Cited

U.S. PATENT DOCUMENTS

| 4,757,267 A | 7/1988 | Riskin |
| 4,797,910 A | 1/1989 | Daudelin |
| 4,933,966 A | 6/1990 | Hird et al. |
| 4,935,956 A | 6/1990 | Hellwarth et al. |
| 5,093,858 A | 3/1992 | Hird et al. |
| 5,335,266 A * | 8/1994 | Richardson, Jr. ... H04M 3/2281 379/114.21 |
| 5,627,887 A | 5/1997 | Freedman |
| 5,633,919 A | 5/1997 | Hogan et al. |

(Continued)

FOREIGN PATENT DOCUMENTS

| EP | 0829996 A2 | 3/1998 |
| EP | 1014671 A2 | 6/2000 |

(Continued)

OTHER PUBLICATIONS

USPTO Petition for Inter Partes Review of U.S. Appl. No. 8,477,766, filed Apr. 25, 2014, 67 pgs.
(Continued)

*Primary Examiner* — Hemant Patel
(74) *Attorney, Agent, or Firm* — Gossman Tucker Perreault & Pfleger, PLLC

(57) ABSTRACT

One embodiment of the present invention provides a collect call method and system thereof, more particularly, in order to charge the called party with a uniform toll for collect call, which is determined by only the type and location of called party terminal. In one embodiment, the collect call method, system and a counsel service providing method use a free VoIP network for part of the voice call link and a charge PSTN network for the rest of the voice call link. In one embodiment, if the first link corresponding to the collect call request is established, the collect call switch calls the called party terminal to establish the second link, and billing on the second link is initiated.

21 Claims, 12 Drawing Sheets

Related U.S. Application Data continuation of application No. 11/099,392, filed on Apr. 4, 2005, now Pat. No. 7,876,744, which is a continuation of application No. PCT/KR03/02447, filed on Nov. 14, 2003.

(51) Int. Cl.
*H04M 15/00* (2006.01)
*H04M 7/12* (2006.01)

(58) Field of Classification Search
USPC ............................ 370/351–357; 379/219–241
See application file for complete search history.

(56) References Cited

U.S. PATENT DOCUMENTS

| | | | |
|---|---|---|---|
| 5,655,013 A | | 8/1997 | Gainsboro |
| 5,684,866 A | | 11/1997 | Florindi et al. |
| 5,850,435 A | * | 12/1998 | Devillier ............... H04M 1/578 379/142.01 |
| 5,859,902 A | | 1/1999 | Freedman |
| 5,867,495 A | | 2/1999 | Elliott et al. |
| 5,926,533 A | | 7/1999 | Gainsboro |
| 5,937,044 A | | 8/1999 | Kim |
| 5,999,525 A | | 12/1999 | Krishnaswamy et al. |
| 6,292,478 B1 | | 9/2001 | Farris |
| 6,304,635 B1 | | 10/2001 | Iwami et al. |
| 6,366,560 B1 | * | 4/2002 | Ohiwane ................ H04L 45/00 370/238 |
| 6,493,437 B1 | | 12/2002 | Olshansky |
| 6,501,837 B1 | | 12/2002 | Adler et al. |
| 6,577,718 B1 | | 6/2003 | Kalmanek, Jr. et al. |
| 6,614,781 B1 | | 9/2003 | Elliott et al. |
| 6,636,504 B1 | | 10/2003 | Albers et al. |
| 6,639,977 B1 | | 10/2003 | Swope et al. |
| 6,704,563 B1 | | 3/2004 | Senn et al. |
| 6,788,674 B1 | * | 9/2004 | Karamchedu et al. ....... 370/352 |
| 6,937,593 B1 | | 8/2005 | Gunasekar et al. |
| 7,382,868 B2 | | 6/2008 | Moore et al. |
| 7,415,004 B2 | * | 8/2008 | Yeom et al. .................. 370/352 |
| 7,505,406 B1 | | 5/2009 | Spadaro et al. |
| 8,477,766 B2 | * | 7/2013 | Kwon ........................... 370/353 |
| 2002/0041660 A1 | | 4/2002 | Nakamura |
| 2002/0049675 A1 | | 4/2002 | Kailamaki et al. |
| 2003/0091028 A1 | | 5/2003 | Chang et al. |
| 2004/0074101 A1 | | 4/2005 | Moore et al. |
| 2005/0074101 A1 | | 4/2005 | Moore et al. |

FOREIGN PATENT DOCUMENTS

| | | |
|---|---|---|
| JP | 10-98494 | 4/1998 |
| JP | 2001-148750 | 5/2001 |
| JP | 2002-152425 | 5/2002 |
| KR | 2001-00000725 | 1/2001 |
| KR | 2001-0017967 | 3/2001 |
| KR | 2001-091175 | 10/2001 |
| KR | 2001-0093507 | 10/2001 |
| KR | 2002-0028856 | 4/2002 |
| KR | 2002-0069077 | 8/2002 |
| KR | 10-2004-0042450 | 5/2004 |
| KR | 10-0458195 | 11/2004 |
| WO | 0072571 A1 | 11/2000 |
| WO | 01/61530 | 8/2001 |

OTHER PUBLICATIONS

SR-2275, "Notes on the Networks" to Bellcore, Issue 3, Dec. 1997, 1,248 pgs.
European Search Report completed Feb. 21, 2008, received in EP 03 77 2898, 2 pgs.
Rizzetto, Daniele et al, "A Voice Over IP Service Architecture for Integrated Communications", IEEE Internet Computing, May/Jun. 1999, pgs. 53-54.
US District Court for the Eastern District of Texas Sherman Division, *Howlink Global LLC v. Securus Technologies, Inc.*, "Securus's Invalidity Contentions", Apr. 21, 2014, 24 pgs.
Report and Recommendation of the United States Magistrate Judge (filed Jun. 28, 2012) 33 pages.
Order Adopting Report and Recommendation of United States Magistrate Judge (filed Aug. 30, 2012) 8 pages.
MD Telecom Database Management Manual, copyright Jan. 15, 1999, Release 2.2 (159 pages).
MDTelecom Price quotation , Feb. 27, 2002 (2 pages).
Webpage Screen shot of MD Telecom docs (1 page).
NCIC (Network Communications International Corp., Press Release 3, Jun. 3, 2011 (1 page).
VocalTec Telephony Gateway, Jun. 1, 2011 (2 pages).
VocalTec Ensemble Architect-VocalTec Telephony Gateway Series Jan. 17, 2000 (18 pages).
Dotcom Technologies Internet Tele . . . , Jun. 3, 2011 (3 pages).
Website printout from Internet Archive Wayback Machine, retrieved on Jun. 1, 2011, of http://web.archive.org/web/19990503064356/http://www.ncic.com/products.htm.
Website printout from Internet Archive Wayback Machine, retrieved on Jun. 3, 2011, of http://web.archive.org/web/200101170408/http://www.dotcomtech.net/press_releases5-99.htm.
Website printout from Internet Archive Wayback Machine, retrieved on Jun. 3, 2011, of http://web.archive.org/web/20000617005654/http://www.dotcomtech.net/contacts.htm.
Website printout from Internet Archive Wayback Machine, retrieved on Jun. 3, 2011, of http://web.archive.org/web/20010407015016/http://www.vocaltec.com/about/press/or_nextgen031798.htm.
Website printout from Internet Archive Wayback Machine, retrieved on Jun. 3, 2011, of http://web.archive.org/web/20000706222324/http://www.dotcomtech.net/.
Website printout from Internet Archive Wayback Machine, retrieved on Jun. 3, 2011, of http://web.archive.org/web/20000617175845/http://www.dotcomtech.net/telephony.htm.
Website printout from Internet Archive Wayback Machine, retrieved on Jun. 3, 2011, of http://web.archive.org/web/20000617042650/http://www.dotcomtech.net/partners.htm.
Website printout from Internet Archive Wayback Machine, retrieved on Jun. 3, 2011, of http://web.archive.org/web/20000612723/http://www.dotcomtech.net/about.htm.
Website printout from Internet Archive Wayback Machine, retrieved on Jun. 3, 2011, of http://web.archive.org/web/20020805194122/http://www.ncic.com/operator_services/services.html.
Notes regarding setup procedures for MicroEOS Automated Collect sequence, date unknown.
MD Telecom's "Price Quotation" dated Feb. 27, 2002.
The Patent Court Decision, dated on Jun. 27, 2007 for case No. 2006 Huh9777, 9845.
Patent Register, Korean Patent Number 0458195 dated Nov. 7, 2006.
Korean Intellectual Property Tribunal Decision dated on Sep. 29, 2006 for case 2005Dang2038.
Korean Intellectual Property Tribunal Decision Tenor Delivery Certification dated on Nov. 3, 2006 for case 2005Dang2038.
Jongkwan Lee, "Domestic VoIP Technology and Business Trend", Information & Communications Abstract Policy, KISDI (Korean Information Society Development Institute), vol. 13, No. 9 (Serial Number 278), pp. 56-60, May 16, 2001.
Support Request Form, "Request for Support to the Internet Telephony (VoIP) Model Service in Company" dated on Jul. 13, 2001.
Advertisements in Newspaper "Sense 082-17 (DACOM)" dated on Jan. 1999.
Articles in Newspapers, 1) "Dacom "Matchmaking with Soldiers . . . dated on Nov. 27, 2001, Money Today, 2) "Dacom Event of Collect Call Service" dated on Nov. 27, 2001, The Korea Economic Daily, 3) "The First Appearance of Voice-Guided International Collect Call Service" dated on Mar. 29, 2000, The Korea Economic Daily, 4) "Event Variety of On Line Company in White Day" dated on Sep. 10, 2001, Kukminilbo, 5) "Variety of Events in White Day" dated on Mar. 11, 2001, Hankookilbo.
Article in Newspaper "The Comparison of Collect Call Service" dated on Sep. 17, 2002.

(56) References Cited

OTHER PUBLICATIONS

Presentation Material "Internet Telephony Service Policy", Ministry of Information and Communication Republic of Korea, CoIP Grand Conference Jul. 6, 2005.
Certificate "The Operation Circumstances of Internet Collect Call Service" dated on Jul. 5, 2006.
ITU (International Telecommunication Union)-T Recommendation H. 323, Nov. 2000.
Jaehong Ahn, "Charging Strategy of Internet Telephony Service Suppliers", Information & Abstract Communication Policy, KISDI (Korea Information Society Development Institute), vol. 14, No. 8 (Serial No. 300), pp. 21-40, May 1, 2002.
Ohsang Kwon, "Communication Service Using VoIP", Information & Communication Policy, KISDI (Korea Information Society Development Institute), vol. 12, No. 23 (Serial No. 269), pp. 1-21, Dec. 16, 2000.
A drafting Form of Dacom dated Dec. 1998.
Articles in Newspapers, Total 11 articles (Before Mar. 5, 2007).
Requirements Analysis and Design for Collect Call Service of Out-of-Town Call, Nov. 9, 1998.
Requirements for Computation System of Subscription / Billing and Opening / Error Management in BORA TEL service, Aug. 28, 2001.
The Explanation of Terms, "Proxy Server, Proxy Gateway, Proxy ARP", " Proxy Server"dated on Dec. 27, 2006.
Preparatory Pleadings and Technique Presentation of Defendant for Case 2006GAHAB24341, Jan. 2007.
Articles in Newspapers (a total of 22 articles): 1) "11 Digit receiving number will be given to internet telephony service" dated on Nov. 14, 2002. The Digital Times, 2) "KT will commercialize messenger-phone next month" dated on Jun. 17, 2002, The Digital Times, 3) "VoIP service will be divided into domestic and international area" dated Oct. 25, 2002, The Digital Times, 4) "Workshop Results of Wholly Responsible Team for Internet Telephony" dated on Sep. 18, 2002, The Digital Times, 5) "Anyuser.Net will serve VoIP to Dongkuk Steel Mill Co., Ltd. after next Sep." dated on Aug. 20, 2002, The Digital Times, 6) Dacom multimedia Internet Corp. will supply the personal video conference service after next month dated on Jul. 16, 2002, The Digital Times, 7) "Samsung Networks Inc. will reinforce the communication service based on IP" dated on May 20, 2002, The Digital Times, 8) Feature Article-Leading Company "Internet Telephony-SEROME" dated on Apr. 30, 2002, The Digital Times, 9) Feature Article-Leading Company "Internet Telephony-GreatHuman Software Co., Ltd." dated on Apr. 30, 2002, The Digital Times, 10) "Spreading Lease of Gateware for Internet Telephony" dated on Jan. 10, 2002, The Digital Times, 11) "Spreading of Company Internet Telephony Service Introduction" dated on Nov. 15, 2001, The Digital Times, 12) Feature Article-VoIP "The Prospect for Domestic and Overseas Market" dated on Oct. 16, 2001, The Digital Times, 13) "Great Human Software Co., Ltd. has built internet telephony system" dated on Jul. 26, 2001, The Digital Times, 14) "Dacom opens the on/off line combined call center" dated on Apr. 3, 2001, The Digital Times, 15) "Communication equipments manufactures release internet telephone" dated on Sep. 2, 2000, The Digital Times, 16) "VoIP based Internet telephony service spreads" dated on May 3, 2000, The Digital Times, 17) "People can use internet telephony by public phone" dated on Nov. 8, 2001, Hankookilbo, 18) "Serome will start the internet telephony service at Daum Communications after the middle of next month" Sep. 23, 2001, The Korea Economic Daily, 19) Serome "Smmatz Messenger Service" Aug. 30, 2001, Money Today, 20) "New telephone number registration for charged internet telephony" May 30, 2001, Maeil Business News Paper, 21) "Serome starts the super high speed internet charged phony, SmmatzCall" Jul. 3, 2001, The Korea Economic Daily, 22) "Serome Synopsis of SmmatzCall Service" dated Jul. 3, 2001, Money Today.
Articles in Newspapers, 1) "HOWLINK won the suit of invalidation of registration filed by LG DACOM and ONSE Telecom . . . " dated on Dec. 8, 2006, Prime Business Journal, 2) "Patent Troubles of Smaill and Medium Enterprises vs. Major Companies" dated on Dec. 11, 2006, INEWS24, 3) "VoIP Patent Troubles of Cyber Intellectual Networks onf the Ministry of National Defense" dated on Dec. 12, 2006, The Electronic Times, 4) "Free Legal Aid of Patent Troubles for Small and Medium Enterprises" dated on Dec. 26, 2006, The Lawlimes, 5) "Troubles of Small and Medium Enterprises vs. Major Companies about Internet Telephony Collect Call Patent" dated on Jan. 4, 2007, Economy 21.
Registration Research Result of National Assembly Library and Moonseok Kang, et al., "Linkage of PSTN and VoIP Service", Magazine of Korea Information and Communication Society, vol. 19, No. 2, pp. 74-84, Feb. 2002.
Korean Intellectual Property Tribunal Decision for case 2006Dang1091 dated on Sep. 29, 2006.

\* cited by examiner

METHOD FOR COLLECT CALL SERVICE BASED ON VOIP TECHNOLOGY AND SYSTEM THEREOF

RELATED APPLICATIONS AND CLAIM OF PRIORITY

The present application for patent is a continuation and claims the benefit under 35 U.S.C. §120 of patent application Ser. No. 12/969,068 entitled Method for Collect Call Service Based on VoIP Technology and System Thereof, filed Dec. 15, 2010, pending, and hereby expressly incorporated by reference herein, which is a continuation application, and claims the benefit under 35 U.S.C. §120 of application Ser. No. 11/099,392, filed on Apr. 4, 2005, now U.S. Pat. No. 7,876,744, issued on Jan. 25, 2011, and hereby expressly incorporated by reference herein, and which is a continuation application and claims the benefit under 35 U.S.C. §120 and §365 of PCT Application No. PCT/KR/2003/002447, filed on Nov. 14, 2003 and published on May 27, 2004, in English, which is hereby expressly incorporated by reference herein.

The present application also claims foreign priority benefits under Title 35, United States Code, §119 of any foreign application(s) for patent, design or inventor's certificate or any PCT international application(s) listed below and have also identified below any foreign application(s) for patent, design or inventor's certificate or any PCT international application(s) designating at least one country other than the United States of America filed for the same subject matter having a filing date before that of the application(s) of which priority is claimed:

| Country (or indicate if PCT) | Application Number | Date of Filing (day, month, year) | Priority Claimed under 37 U.S.C. 119 |
|---|---|---|---|
| Korea | 10-2002-0070751 | 14 Nov. 2003 | Yes |
| Korea | 10-2003-0029927 | 12 May 2003 | Yes |

FIELD

The present invention relates to methods and systems for collect call service, and more particularly, in order to charge a uniform toll for collect calls regardless of location and/or type of receiver's terminal, methods and systems for establishing a call link between a caller and the receiver through a VoIP network that is free for charge and a conventional network that is charged for the receiver.

DESCRIPTION OF THE RELATED TECHNOLOGY

Conventional telecommunication services have been a media for only voice communication, however, current telecommunication services are evolving to new means for providing various high-quality services. The goal of present telecommunication service provider is to provide a new telephone service, which is customized to the subscriber's needs, with low cost and efficiency, and it is the most important thing to get a competitiveness than rivals. Internet, the most suitable solution that can make this goal possible, becomes an essential part of ordinary life with explosively increasing number of users. The connection between PSTN network and IP network gives various opportunities to wired service providers, mobile service providers, ISP (Internet service provider)s, device manufacturers and value-added information service providers, respectively.

The efforts to provide the conventional telephone service and value-added service through Internet, both previously provided on PSTN network, are being made by standardization bodies such as IETF, ITU, ETSI, and so on. IETF has proposed several standards such as SIP (session initiation protocol), SDP (session description protocol), MEGACO (media gateway control protocol), SIGTRAN (signaling transport) for Internet telephony and value-added service on Internet. H.323, ITU-T studied from 1990, is a standard for communicating voice/data/image between terminals on packet network. In H.323, four essential entities, which are terminal, gateway, gatekeeper and MCU (multipoint control unit), were defined for the purpose of communication on network, and H.323 v3 supporting TCP and UDP is currently published. In order to meet the needs for common solution such as VoN (voice over network), ETSI (European Telecommunications Standards Institute) established TIPHON (Telecommunications and Internet protocol Harmonization Over Networks) for development and standardization in considering technical issues occurring when SCN (Switched Circuit Network) and Internet are connected to each other. Currently, among VoIP standards, H.323 is the most widely used. FIG. 1A illustrates a schematic of VoIP network according to H.323 standard. PSTN phone 10b can set up a call directed to a receiver's phone 13 through a registered gateway 11a and VoIP stand-alone phone 10a can also set up a call directed to the receiver's phone 13 without gateway. Calling/called gateways 11a, 11b as a node for entering into a different network match networks that operate based on H.323 standard and different standards, and convert data and control signals entered from one network to be suitable for the matched network. Gatekeeper 12, one entity of the H.323-based network, binds several endpoints, for example, gateway, user terminal (PC, VoIP stand-alone phone), MCU (not shown) into a specified portion of the network called a "zone" and performs control/management/registration on them included within the zone. Gatekeeper 12 is not an essential entity in H.323-based network, however, it can perform some main tasks such as an address conversion, a call acknowledgment, and a bandwidth control, and some additional tasks such as a call control, a billing and generation of statistical data. So far, the most preferable billing method for the voice telecommunication service that has been introduced in VoIP system is a method using prepaid card. The prepaid car has exchangeable value in various forms such as cash, point, mileage, coupon and so on. Because there are so many calling parties and calling terminals on VoIP network rather than on PSTN network or mobile network and consequently it is very difficult to charge respectively for each call, the prepaid card was the most effective solution for VoIP billing system. But, although service charge of voice telecommunication service of VoIP network is cheaper than that of any other networks, the number of VoIP users does not increase because a user is forced to buy the prepaid card before using VoIP network. In another method, a user may use postpaid after contracting with a service provider before use.

Differently from the VoIP system, the number of users for collect call in PSTN network is increasing more and more. Even if the collect call service was originally provided by PSTN service providers who suffered from rapid decrease of subscribers due to the development of mobile telecommunication, currently the mobile telecommunication service providers provide the same service. FIG. 1B illustrates a telecommunication system for collect call service. The caller enters a collect call identifier and a called party's number on phone 20a, 20b and if the called party accepts the collect call, toll for the collect call is charged to the called party. For example, if the caller 20b makes a call on mobile phone to the called party 25a, PSTN subscriber, the tolls for using mobile network and PSTN network are charged to the called party. Thus, it is the problem of the conventional collect call service that toll of collect call is changed according to not only the type of called party's terminal but also the type of caller terminal.

FIG. 1C is a flowchart of the conventional counsel service based on ARS (Auto Response System). Referring to FIG. 1C, a user who wants a charged counsel (hereinafter, "counsel user") makes a phone call to the phone number that the counsel user already knows at step 30. The charged counsel services on PSTN/mobile network are provided through ARS, and there are many kinds of systems such as fortune, stocks, tax and so on. On receiving a phone call, ARS generates several voice menus which the counsel user can select and receives the selection of counsel user at step 35. When the call is connected between the counsel user and the selected counselor at step 40, the counsel user must explain what he wants to be advised (hereinafter, "basic information") at step 45, then listens the result of counsel (hereinafter, "counsel information") at step 50.

Most of ARS counseling systems charge the toll only after the call is connected to the ARS counseling system. It takes almost time of charged counsel service to select counselor and explain basic information, and if the counsel user does not explain basic information properly, consequently it makes the total time of call longer. And, since the communication means in ARS counseling service is limited to only voice, a few kinds of services, e.g. such as fortune telling or interpretation of dream that can communicate basic information and counsel information with voice, are available through ARS. Also, since ARS counseling service is provided in real time, if the counselor is off duty or plural counseling requests occur at the same time, the counseling service cannot be provided. Also, since ARS counseling service requires high-cost CTI equipment, it makes difficult for the service provider to start the ARS counseling service.

As aforementioned, there are some problems that a VoIP user is required to buy a prepaid card before use and the toll of collect call is dependent on the type of caller terminal as well as the type of called party terminal.

SUMMARY

One aspect of the invention provides methods and systems for collect call service based on VoIP network that do not require a prepaid card in order to use a VoIP call and reduce toll being charged to the called party.

Another aspect of the invention provides methods and system for collect call based on VoIP network, on these methods and systems only the type and location of called party's terminal, not type and location of caller terminal, are considered to decide the toll of collect call and consequently the toll of collect call is reduced.

Another aspect of the invention provides a method of counseling service based on VoIP collect call system. In addition, the object of the present invention is to provide a desirable counsel service by enabling the counsel user to freely send basic information and counselor selection information on his terminal and the letting the counselor produce the fully-considered counsel information based on basic information.

Another aspect of the invention provides a method of providing a collect call service based on the VoIP system, the method comprising: establishing a first link between a called gateway and a collect call switch, on receiving a collect call request from the VoIP network existing between a calling gateway being coupled to a caller terminal and the called gateway being coupled to the collect call switch, wherein the caller terminal can access to the called gateway by use of already-known access information; establishing a second link between the collect call switch and the called terminal; connecting the first link and the second link to initiate a billing process for the second link responsive to a collect call acceptance in the form of DTMF signal from the called terminal; and releasing the connected link to end the billing process responsive to a normal call end request from one of the caller terminal and the called terminal.

Still another aspect of the invention provides a method of providing a collect call service based on the VoIP network consisting of plural gateways, the method comprising: performing an authentication of the caller terminal and a RAS (Registration/Admission/Status) approval of the collect call request on receiving a collect call request from a caller terminal that already knows access information of a VoIP collect call system, and acquiring access information of a called gateway corresponding to the called terminal; connecting a calling gateway and the called gateway by sending the collect call request to the called gateway if RAS approval and access information of the called gateway are acquired; establishing a first link between the called gateway and a collect call switch responsive to the collect call request; establishing a second link between the collect call switch and the called terminal; connecting the first link and the second link to initiate billing process for the second link responsive to a collect call acceptance in the form of DTMF signal from the called party's terminal; and releasing the connected link to end the billing process responsive to a normal call end request from one of the caller terminal and the called terminal.

Still another aspect of the invention provides a collect call system based on VoIP, comprising: a called gateway, being coupled to a calling gateway via the VoIP network, establishing a VoIP link to the calling gateway on receiving a collect call request from a caller terminal via VoIP network, wherein the caller terminal can access to the called gateway by use of already-known access information; and a collect call switch, being coupled to a called terminal via one selected from a group consisting of PSTN network and mobile network, establishing a first link to the called gateway and a second link to the called terminal responsive to the collect call request, connecting the first link and the second link responsive to a collect call acceptance from the called terminal, and performing a billing process for the second link.

Still another aspect of the invention provides a method of providing counsel service based on the VoIP collect call system, the method comprising: storing an affiliated website identifier, a collect call number that a counsel user submits and a counselor identifier indicating who the counsel user selects on database on receiving basic information from a counsel user terminal being coupled to an affiliated website; sending basic information, the affiliated website identifier and the collect call number to a counselor terminal corresponding to the counselor identifier; and calculating a total call time by recording a call start time when the counselor terminal make a call to the collect call number and a call end time when the call ends, wherein the basic information is one selected from a group consisting of text data, image data, sound data and combination of them.

Yet another aspect of the invention provides a method of providing counsel service based on the VoIP collect call system, the method comprising: storing a collect call number that a counsel user submits and a counselor identifier indicating who the counsel user selects on database if a counsel user terminal being coupled to a counseling service server sends basic information to a counselor terminal being coupled to the counseling service server; calculating a total call time by recording a call start time when the counselor terminal make a call to the collect call number and a call end time when the call ends; assorting valid call and invalid call by using at least one of the call start time, the call end time and the total call time; and calculating a sum of the total call time of valid calls for the counselor, wherein the basic information is one selected from a group consisting of text data, image data, sound data and combination of them.

DETAILED DESCRIPTION OF CERTAIN INVENTIVE EMBODIMENTS

Hereinafter, embodiments of the present invention will be described with accompanying drawings. But, describing the present invention with embodiments is only for helping those who skilled in the art to understand the present invention with ease, not intended to limit the spirit and scope of the present invention to the embodiments described in the accompanying drawings and the detailed description. In this specification, for the sake of brief description, a H.323 compatible VoIP system among several VoIP standards will be described. But, it is not intended to limit the present invention to the H.323 compatible VoIP system, and it is apparent that those who skilled in the art can make equivalent system, in embodiments of the present invention, compatible with SIP, MGCP and so on.

Figure 1A:
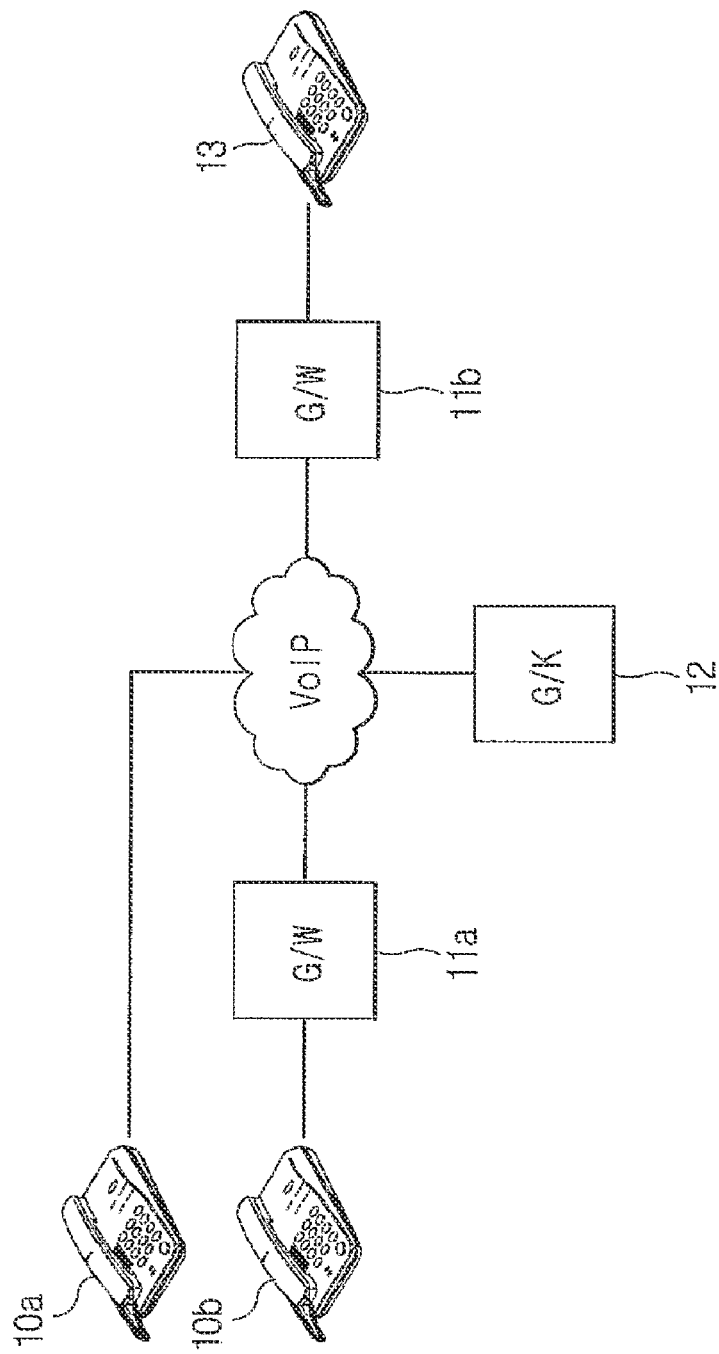
FIG. 1A illustrates a VoIP network according to H.323 standard.
Figure 1B:
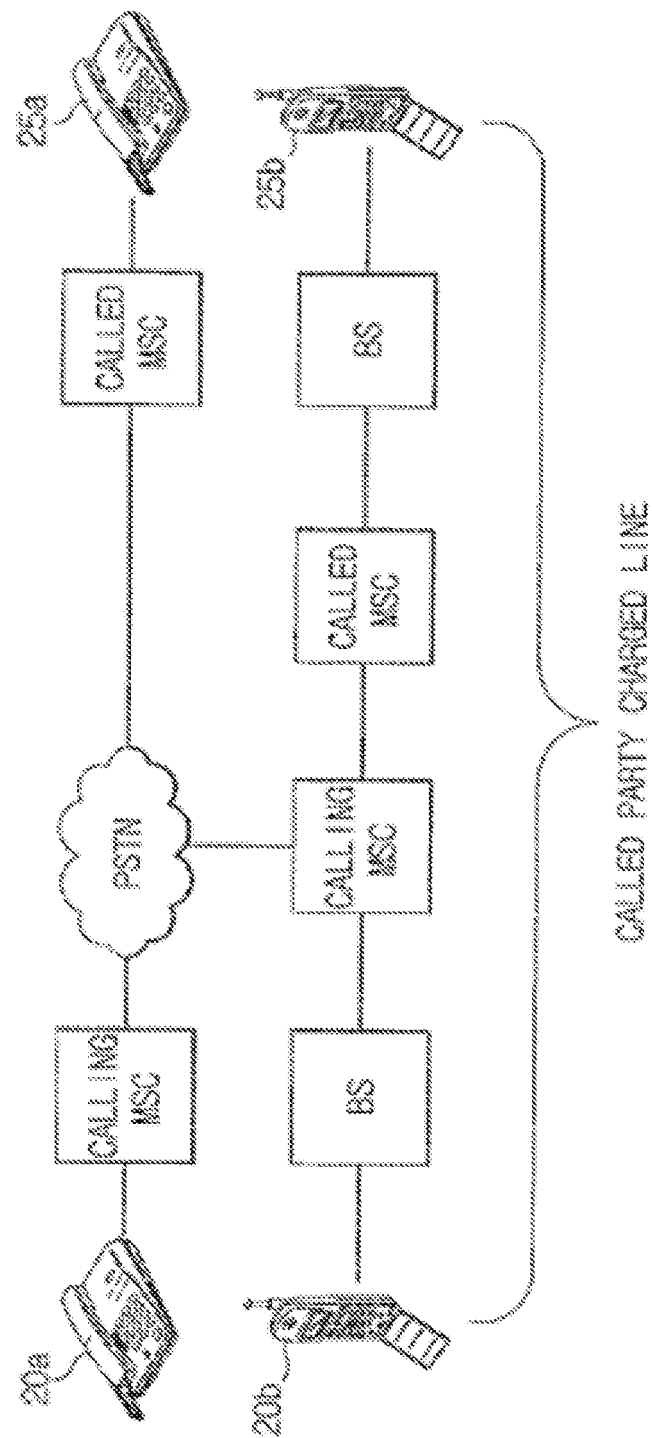
FIG. 1B illustrates the telecommunication system for collect call service.
Figure 1C:
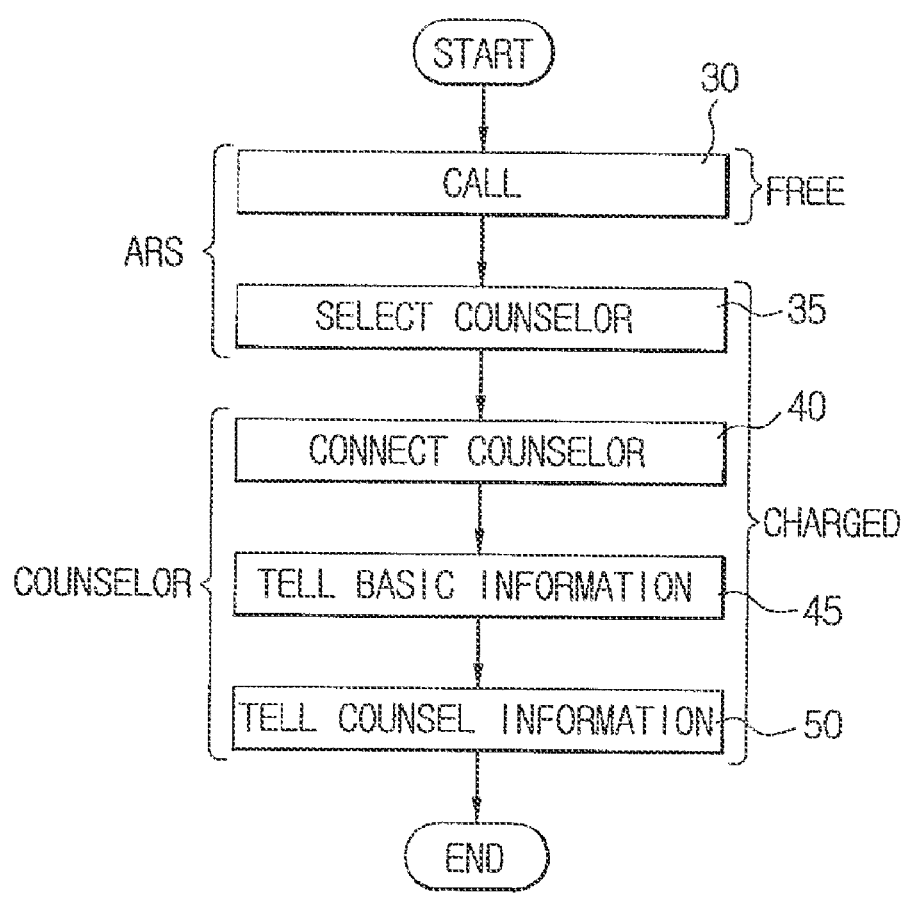
FIG. 1C is a flowchart of the conventional consulting service based on ARS.
Figure 2:
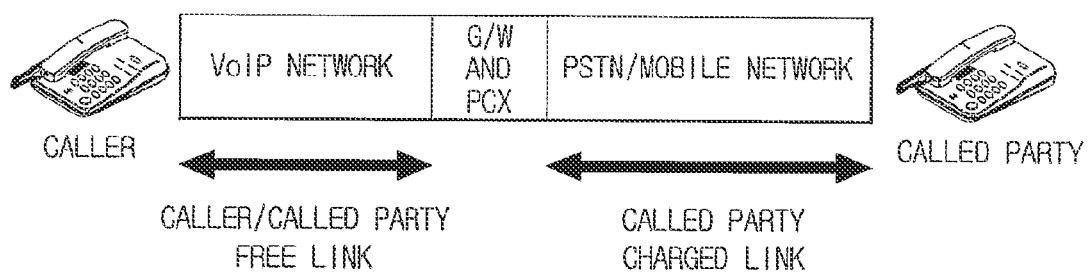
FIG. 2 illustrates the method for collect call service based on VoIP according to one embodiment of the invention.

FIG. 2 illustrates the method for collect call service based on VoIP according to one embodiment of the present invention.

Referring to FIG. 2, the collect call according to one embodiment of the present invention is serviced through the VoIP network existing between the caller terminal and a called gateway working as PSTN-VoIP connecting node and PSTN/mobile network existing between the called gateway and a called terminal. The VoIP network comprises the caller terminal, the calling gateway and called gateway, and can further comprise a gatekeeper and a collect call proxy server. The PSTN network consists of a collect call switch and a general switch, and mobile network consists of MSC (mobile switch center) and BSC.

The difference between the collect call service of one embodiment of the present invention and conventional collect call service is that the called party pays toll for a charged link that is predetermined by the type and/or location of the called terminal. Because all caller terminals in one embodiment of the present invention send call request and perform voice call on the VoIP network, type of caller terminals is same. For example, if the type of caller terminal is a mobile terminal and the type of called terminal is a general phone being coupled to PSTN, toll for collect call including toll for PSTN use as well as toll for mobile network use and network access fee is charged to the called party. In another example, if a caller terminal locates at foreign country, toll for collect call including a toll for local call in the foreign country as well as a toll for international call is charged to the called party. But, since additional charge for using VoIP network in one embodiment of the present invention is not imposed to neither of the caller and called party when the caller requests a collect call, consequently the toll for collect call becomes reduced. Hereinafter change of the toll for collect call according to location of called terminal will be described with example. In the case of the collect call switch in Seoul, if the called terminal locates in Seoul, the called party pays local call charge as toll for the collect call, but if the called terminal locates in Kyung-gi province far from Seoul, the called party has to pay long distance call charge as toll for the collect call. Exceptionally, if caller terminal is coupled to a VoIP gateway of a service provider for special telecom, call link between the caller terminal and the gateway is charged to the caller or called party. To whom the service provider charges can be changed according to the service provider's policy.

For this toll-saving effect, the caller terminal must have a VoIP accessing function and a collect call switch must have a VoIP collect call processing function that can distinguish the collect call request of VoIP terminal from collect call requests of PSTN/mobile terminal to process differently. In one embodiment of the present invention, the caller terminal accessible to VoIP network comprises (1) a computer including a gateway module embodied in software or hardware, (2) a VoIP stand-alone phone including a gateway module embodied in software or hardware and (3) a phone that can be connected to the calling gateway through conventional phone networks (e.g. PSTN/mobile network). Hereinafter, the method and system for the VoIP collect call system according to embodiments of the present invention will be described with accompanying drawings.

Figure 3:
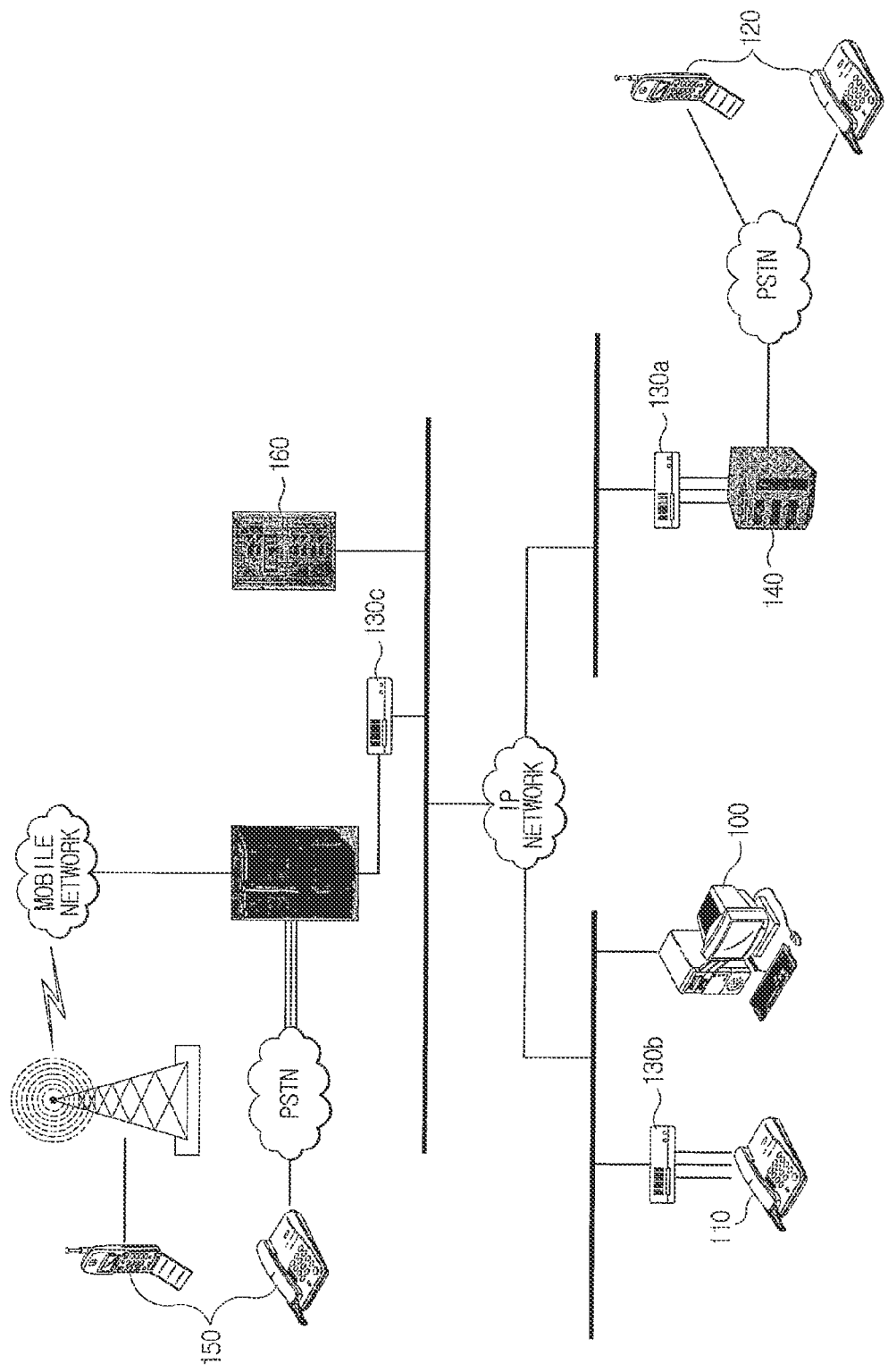
FIG. 3 is a schematic of the VoIP collect call system according to one embodiment of the invention.

FIG. 3 is a schematic of the VoIP collect call system according to one embodiment of the present invention. Referring to FIG. 3, the VoIP collect call system consists of caller terminal, calling gateway, called gateway, collect call switch and called terminal. Additionally, the VoIP collect call system further comprises a gatekeeper (not shown) and a collect call proxy server 160. Some caller terminal, calling gateway and called gateway are connected to each other through an IP network supporting VoIP standard (hereinafter, "VoIP network"), and collect call switch and called terminal are connected to each other through conventional network (hereinafter, "PSTN network"). Also, the term "gateway" in embodiments of the present invention means a node connecting two different networks, and will be used to describe the preferred embodiment having compatibility with H.323. Thus, it is apparent to those who skilled in the art that the gateway can be replaced with equivalent entity in another VoIP network that supports a different standard from H.323.

The caller terminal comprises a PC 100, a VoIP stand-alone phone 110 and a phone 150 that is coupled to a VoIP gateway through the PSTN network. The calling gateway can exist in various forms. In the case of PC 100, gateway module being embodied in software/hardware can be included in PC 100 or server being coupled to the VoIP network, so that the caller can access to the VoIP network by PC 100. In the case of the VoIP stand-alone phone 110, a gateway module being embodied in software/hardware can be included in the phone 110 or an additional gateway that several VoIP stand-alone phones can be connected to. In the case of phone 150 that is coupled to the VoIP gateway through the PSTN network, the calling gateway is coupled to or included in switch. The collect call request generated by caller terminals 100, 110, 150 include a collect call identifier, which is recognized as a collect call by the calling gateway 130b, 130c or called gateway 130a, and a phone number of called terminal as a collect call number. And, the collect call request further includes access information of a called party so that the calling gateway 130b, 130c directly send the collect call request to the called gateway 130a. In the case that the VoIP collect call system includes the gatekeeper for RAS authentication and gateway assignment or the collect call proxy server, the collect call request can further include access information of the called gateway or gatekeeper/collect call proxy server.

The called gateway 130a is coupled to the calling gateway 130b, 130c through the VoIP network, and is electrically coupled to the collect call switch. The called gateway enables a voice call between two terminals by establishing H.323 compatible link to the calling gateway responsive to the collect call request from the caller terminals 100, 110, 150. And, the called gateway notifies a VoIP collect call to the collect call switch so that the collect call switch can perform a billing process.

In one embodiment, since the use of the VoIP network is not charged and the use of PSTN link between collect call switch and called terminal is only charged, access information of the called gateway can be opened differently from the conventional VoIP system. In the conventional VoIP system, if access information of calling/called gateway were opened, unauthorized calls for free use will occur frequently. In order to prevent unauthorized calls, the conventional VoIP system manages access information in the gatekeeper and there is no way that user can know it. Thus, in one embodiment, the caller who already had a gateway for other VoIP system can access directly to the called gateway by use of opened access information. In another embodiment, if the VoIP system includes a gatekeeper or a collect call proxy server for managing plural called gateways being located at each zone, access information of the gatekeeper or the collect call proxy server can be also opened as described above.

The collect call switch 140 is electrically coupled to the called gateway 130a, and is coupled to the called terminal 120 via PSTN network. Responsive to the collect call request from the called gateway 130a, the collect call switch 140 establishes PSTN links to the called gateway 130a and the called terminal 120, respectively, and connects each link, namely, sets up a voice call between the caller terminal and the called terminal, on receiving a collect call acceptance from the called terminal 120. And, if the voice call is set up between the caller terminal and the called terminal, a billing process is initiated. In one embodiment, it is preferable to produce only the use of PSTN link between the collect call switch and the called terminal as a toll for collect call, and the toll for collect call is a multiplication of a unit charge that is predetermined according to the type of the called terminal and total time of call. But, various billing methods can be made according to the policy of telecommunication service provider who manages the collect call switch 140, and even in these cases, the target of billing is only the PSTN link between the collect call switch 140 and the called terminal 120.

In one embodiment, in establishing voice call between the caller terminal and the called terminal, the collect call proxy server 160 applies various business processes to different kind of networks (PSTN network, VoIP network). Particularly, the collect call proxy server 160 performs a network routing process for routing the collect call request to collect call networks and VoIP networks, a call statistics/additional service providing process for providing caller statistics and CID (Caller ID), and an OA&M (Operation, Administration, Management) process for generating billing statistics for each network and call management. In addition, if the VoIP collect call service is provided only to the subscribed members, the collect call proxy server can have a subscriber authentication process for confirming the validity of subscription and allowing the right to use the collect call service.

Figure 4:
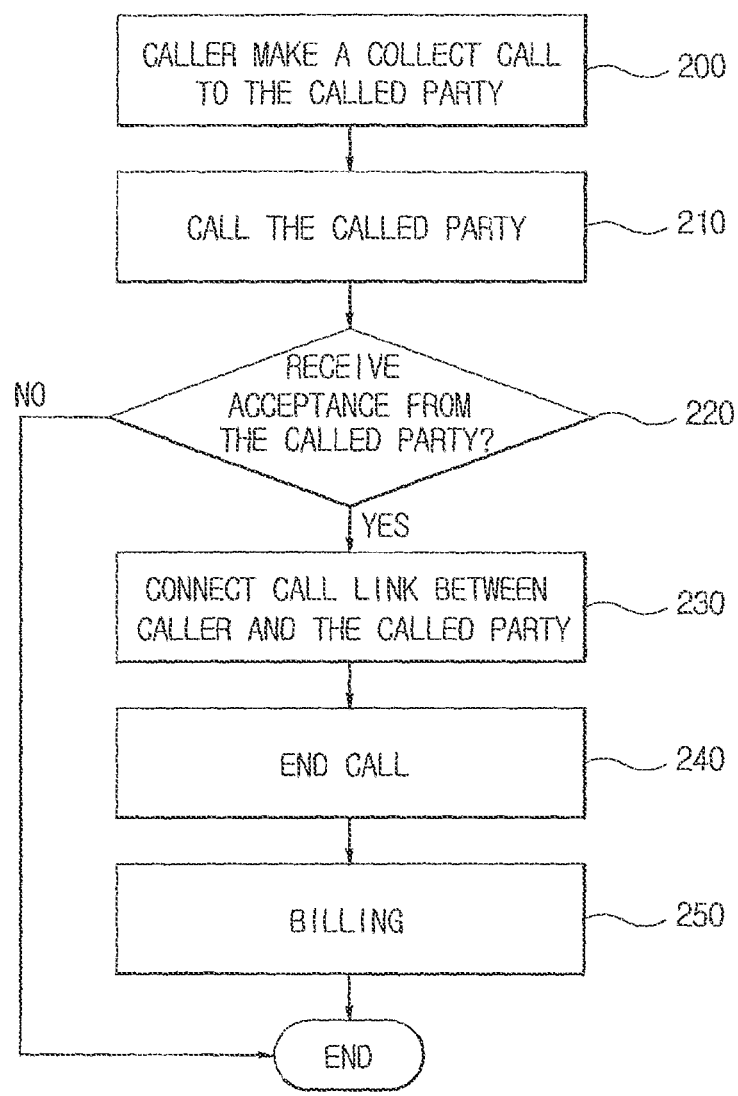
FIG. 4 is a flowchart for illustrating the collect call method based on VoIP network according to one embodiment of the invention.

FIG. 4 is a flowchart for illustrating the collect call method based on the VoIP network according to one embodiment of the present invention. Referring to FIG. 4, at step 200, the caller terminal sends the collect call request including a collect call identifier for indicating that the type of call is collect call and a collect call number.

At step 210, on receiving the collect call request, the collect call number is extracted from the collect call request and then the called terminal is called.

At step 220, if the called terminal answers the call, then it is determined whether the answer is the collect call acceptance or denial. According to the determination, if the answer is acceptance, then the method proceeds to step 230; otherwise, the method terminates in step 220.

At step 230, if the collect call acceptance is sent from the called terminal, the voice call link is connected between the caller terminal and the called terminal. Over the connected voice call link, the caller and the called party can communicate with each other. On connecting voice call link, billing process for counting total call time is initiated.

At step 240, on receiving a normal call end request from the caller terminal or the called terminal, then the voice call link is released and the count of total time ends.

At step 250, the counted total call time and the unit charge is multiplied to produce the toll for collect call and the toll for collect call is charged to the called party.

Figure 5:
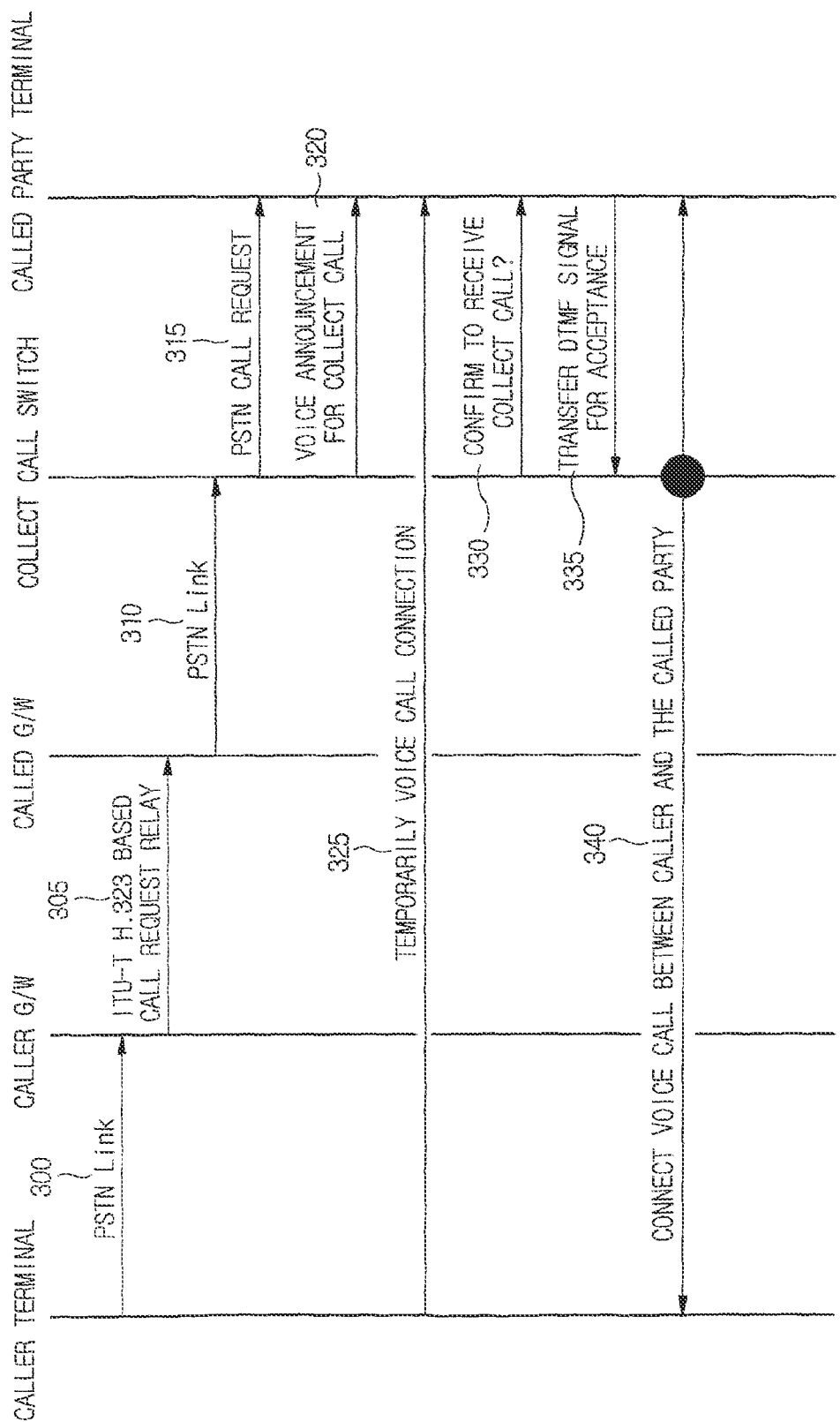
FIG. 5 is a flowchart of signaling on the VoIP collect call system according to one embodiment of the invention.

FIG. 5 is a flowchart of signaling on the VoIP collect call system according to one embodiment of the present invention. Especially, the flowchart of FIG. 5 shows the signaling of the system that does not include a gatekeeper for RAS authentication.

Referring to FIG. 5, at step 300, the caller terminal sends the collect call request to the calling gateway. The collect call request includes the collect call identifier and the collect call number. If the caller terminal is VoIP stand-alone phone or PC, then the step 300 may be omitted.

At step 305, on receiving the collect call request, the calling gateway performs a call signaling to the called gateway corresponding to the collect call identifier. Since this embodiment is performed at the VoIP system compatible with H.323, the call signaling is a message of H.225 protocol. And, the gatekeeper is not included in the system so that the call signaling is sent directly to the called gateway. On receiving the call signaling, the called gateway and the calling gateway are connected through the VoIP network. The control signaling messages are exchanged between the gateways according to the H.245 protocol (not shown).

At step 310, the called gateway requests PSTN link to the collect call switch. The collect call switch establishes PSTN link to the called gateway.

At step 315, the collect call switch calls the called terminal by use of the collect call number included in the collect call request. When the called terminal answers, the collect call switch establishes PSTN link to the called terminal, and at step 320, outputs voice announcement telling it is a collect call.

At step 325, after finishing voice announcement, the collect call switch connects temporarily the voice call link between the caller terminal and the called terminal so that the called party can recognize the caller. The step 325 may be omitted according to the telecommunication service provider's policy.

At step 330 to 340, after releasing voice call link, a voice announcement for request to accept the collect call is outputted to the called terminal. On receiving DTMF signal corresponding to a specific button, the collect call switch analyzes the signal and determines whether the called party accepts the collect call. According to the determination, if the called party accepts the collect call, the collect call switch connects the voice call link between the caller terminal and the called terminal and initiates the billing process.

Then, on receiving the normal call end request from the caller terminal or the called terminal, the voice call link is released and the total call time is calculated. And toll for collect call is generated.

Figure 6:
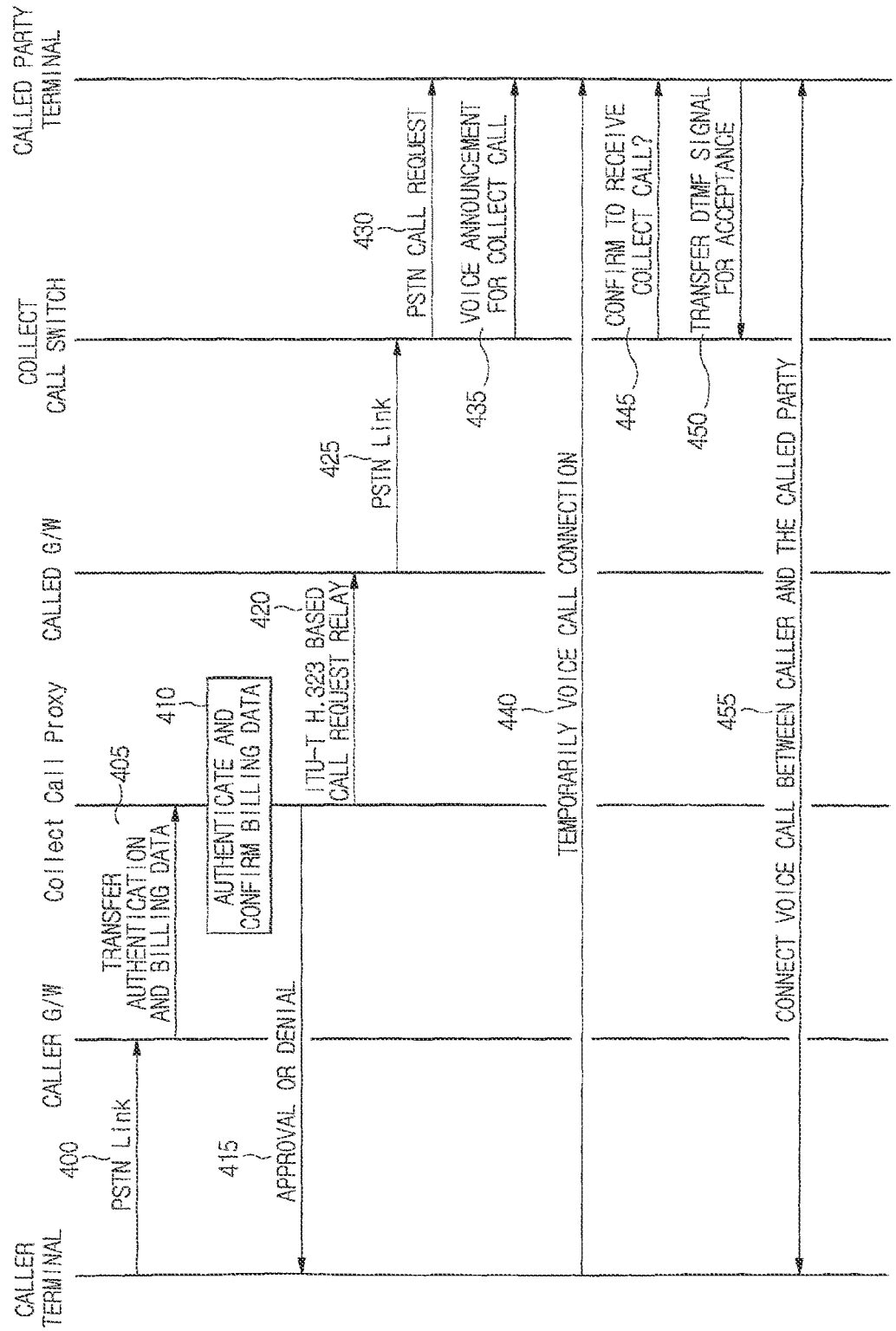
FIG. 6 is a flowchart of signaling on the VoIP collect call system according to one embodiment of the invention.

FIG. 6 is a flowchart of signaling on the VoIP collect call system according to one embodiment of the present invention. Especially, the flowchart of FIG. 6 shows the signaling of gatekeeper including approval of collect call and confirmation of billing data. The description same as FIG. 5 will be omitted here if it does not hurt the spirit of the present invention.

Referring to FIG. 6, at step 400, on receiving a PSTN link connecting the request corresponding to the collect call request, the calling gateway establishes PSTN link to the caller terminal. If the caller terminal is VoIP stand-alone phone or PC, then the step 400 may be omitted.

At step 405, if the PSTN link is established, the calling gateway sends the collect call request and information about the caller party terminal to the call proxy server to relay them to the called gateway. In addition, the calling gateway can request the call proxy server to confirm that the caller party is valid subscriber who can use the collect call service and to perform a billing process for the caller party, if it is needed.

At step 410 and 415, on receiving the collect call request and caller party information, the collect call proxy server determines whether the caller party has the valid right to use collect call service and then sends the result of determination to the caller terminal via the calling gateway. In more detail, the collect call proxy server relays the collect call request to one of collect call networks and VoIP network according to the collect call number, generates call statistics for each caller, and provides additional services such as CID. And, the collect call proxy server produces billing statistics for each network and manages call processes. Also, the collect call proxy server, if billing process for each caller is required, can perform confirmation process about this.

At step 420, the collect call proxy server sends a call signaling message corresponding to the collect call request to the called gateway so that the calling gateway and the called gateway are connected to each other.

Since step 425 to step 455 are same as step 310 to step 340, description about these steps will be omitted.

Figure 7:
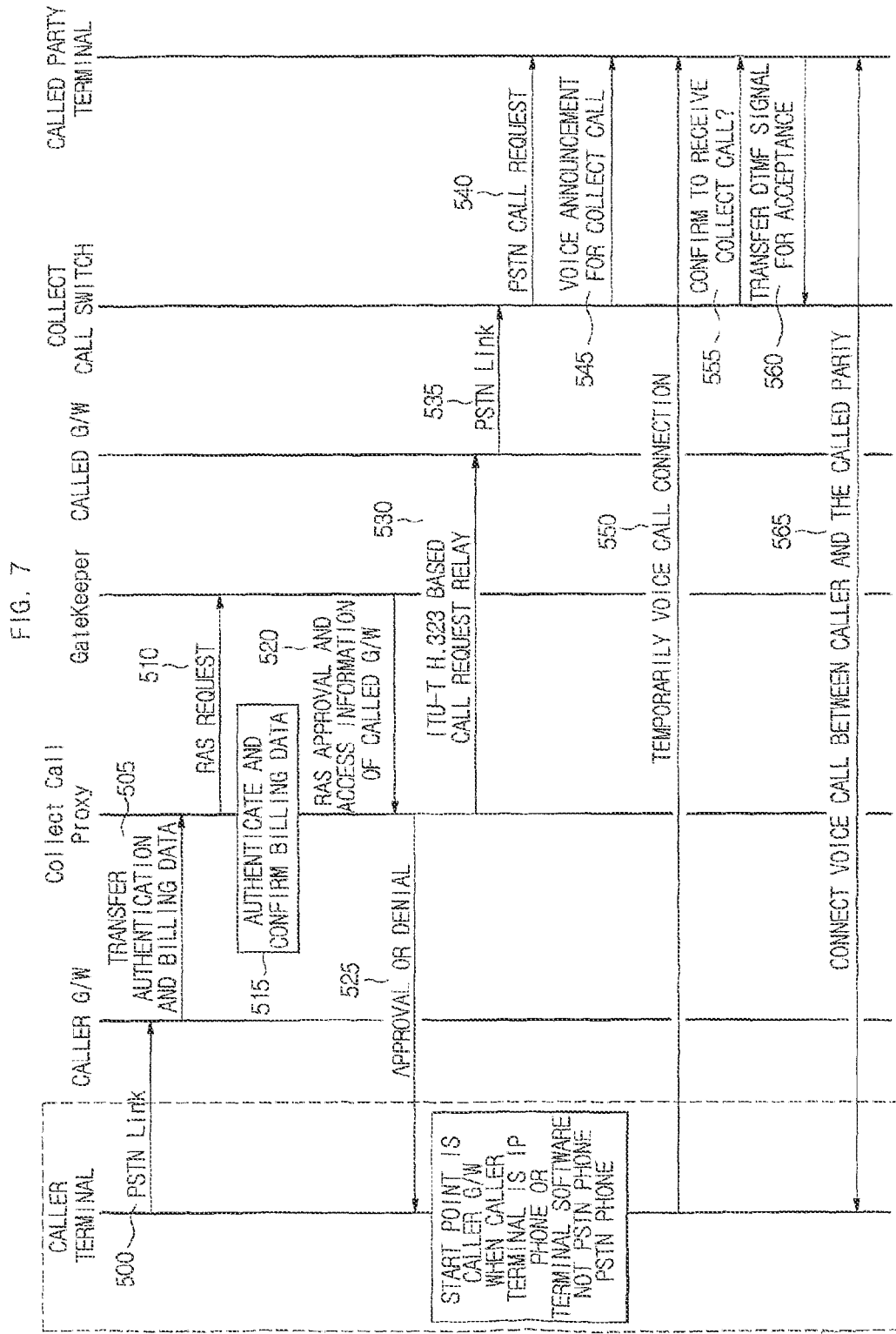
FIG. 7 is a flowchart of signaling via the collect call proxy server and the gatekeeper.

FIG. 7 is a flowchart of signaling via the collect call proxy server and the gatekeeper. Especially, the flowchart of FIG. 7 shows the signaling of the VoIP system including the gatekeeper for RAS. The description same as FIG. 5 and FIG. 6 will be omitted here if it does not hurt the spirit of the present invention.

Since step 500, 505 and 515 are same as step 400 to step 410 of FIG. 6, description about these steps will be omitted.

At step 510, on receiving the collect call request and caller party information, the collect call proxy server sends RAS message to the gatekeeper that manages all entities of the VoIP system. On receiving RAS message, the gatekeeper registers the calling gateway and approves the requested collect call. Also, the gatekeeper processes the collect call request: searches access information of a called gateway suitable for processing the collect call request.

At step 520, the gatekeeper sends the result of registration of the calling gateway and approval of the collect call and access information of the called gateway to the collect call proxy server. On receiving the result of approval of the collect call and access information of the called gateway, the collect call proxy server approves the caller party to use collect call service.

At step 525, the collect call proxy server sends the result of approval to the caller party terminal, and at step 530, sends the collect call request to the called gateway according to access information received from the gatekeeper so that the calling gateway and the called gateway are connected to each other.

In another embodiment, the caller terminal, which receives the approval from the collect call proxy server at step 525, can send caller information stored in the caller terminal to the gatekeeper via the collect call proxy server. If approval is acquired, then caller information is sent to the called gateway and is displayed on the called terminal. Where, caller information is text, image or combination of text and image.

Since step 535 to 565 are same as step 425 to step 455 of FIG. 6, description about these steps will be omitted.

Figure 8:
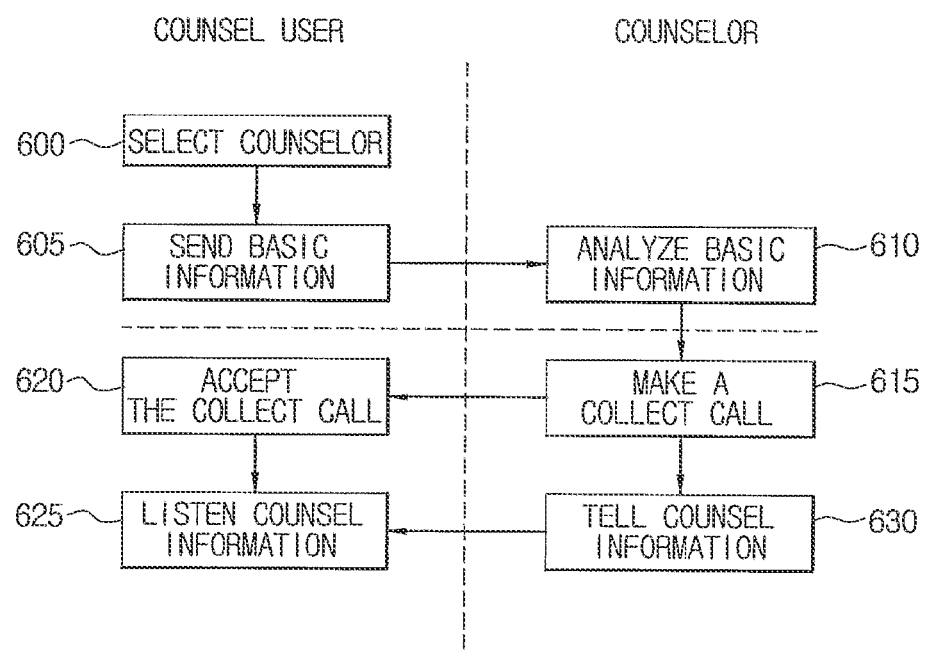
FIG. 8 illustrates a method for providing a counsel service based on VoIP collect call service.

FIG. 8 illustrates a method for providing a counsel service based on the VoIP collect call service. Referring to FIG. 8, at step 600, the counsel user selects a counsel service by use of a client program installed on counsel user terminal, and then selects a counselor who provides the selected counsel service from counselor list. Where, the counsel user terminal is one of electronic data processing devices (e.g. computer, PDA, notebook computer, and so on) being coupled to wired/wireless Internet or cellular phone being coupled to mobile network. Moreover, the client program installed in the counsel user terminal is a general-purpose web browser or dedicated browser. Where, a plug-in program for using the counsel service may be installed in the general-purpose web browser in advance, or may be automatically downloaded from an affiliated website or counsel service management server when the counsel user uses the counsel service.

After counsel service and counselor are selected, the counsel user sends basic information to the counselor at step 605. If the counsel service is provided through the affiliated website, the counsel user uploads the basic information to a bulletin board or sends it to the counselor through the affiliated website. Where, sending the basic information through affiliated website may be accomplished by one of following ways: (1) the counsel service management server relays it to the counselor terminal, (2) the affiliated website sends it directly to the counselor terminal (not via the counsel service management server), (3) the counsel terminal receives it directly from the affiliated website (not via the counsel service management server). If the counsel service is provided by P2P method, the basic information is sent directly to the counselor terminal from the counsel user terminal. Data transmission technology is well known to those who skilled in the art so that detailed description will be omitted.

Basic information is one of text data, image data, sound data and combination of them. Since information that can be delivered in voice can be changed according to the counsel user and it may be impossible to deliver all information especially in a specialized counsel service, the counsel user can provide basic information being needed for counselor in various forms of data. For example, in the case of fortune telling service using Taro cards, the counsel user has to select several cards from a set of Taro cards to receive the counsel service. But, in the case of phone counsel service using ARS, since the counsel user cannot select cards, the counsel user receives simple information in text from Internet or has to meet a fortuneteller in person at present. But, according to one embodiment of the present invention, when the counsel user selects cards and fortuneteller on his terminal, the fortuneteller can receive information about which cards the counsel user selected, and counsel information in voice can be delivered to the counsel user's phone by collect call. In the case of patent counsel service, there are many cases that the counsel user cannot explain fully what he invents. Thus, to receive a patent counsel service, an inventor must meet a patent attorney so that time and financial loss are inevitable. That is, in the case of invention having low patentability, the inventor needs to meet the patent attorney in person and then provides supplementary information to receive correct counsel service. One embodiment of the present invention can be applied to other specialized counsel services such as medical, tax, law and so on.

On receiving basic information, the counselor analyzes basic information at step 610, then makes a collect call to the counsel user at step 615. Where, the counselor can make a collect call from computer to computer or computer to phone by just clicking a call button displayed on his terminal.

The counsel user who receives the collect call from the counselor determines whether he accepts or not at step 620, and then listens counsel information from the counselor at step 625 and 630.

Figure 9:
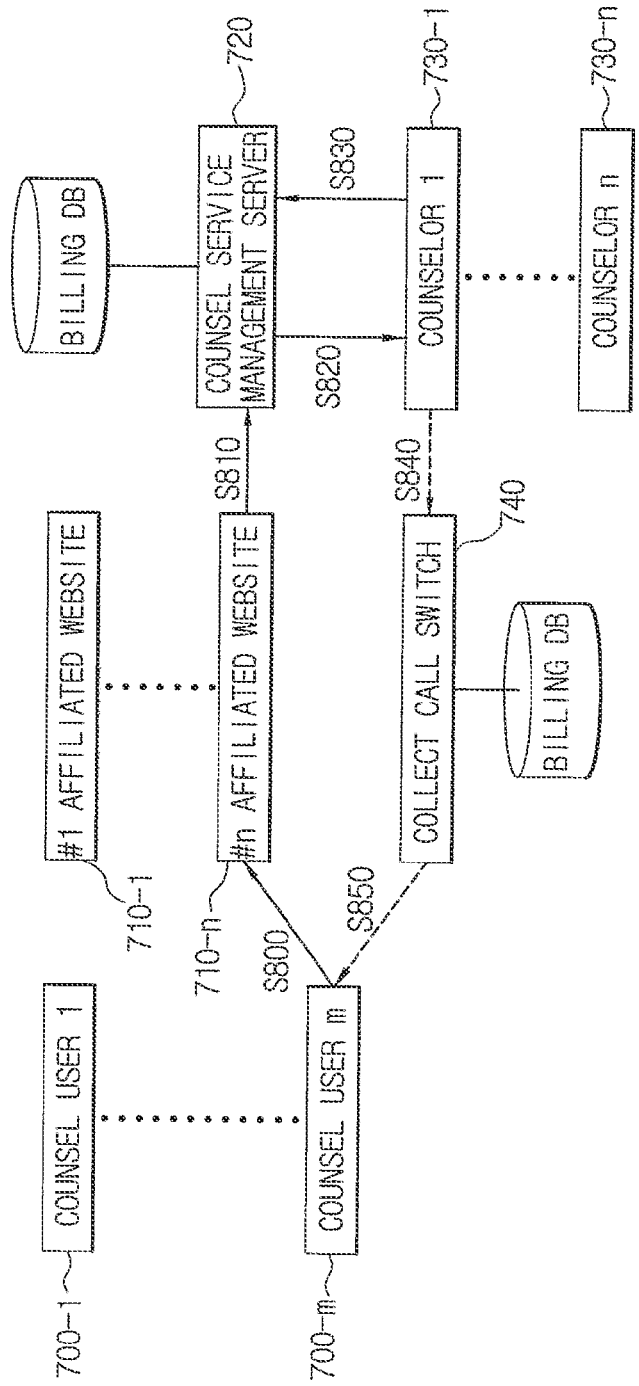
FIG. 9 is a flowchart of method for counsel service according to another embodiment of the invention.

FIG. 9 is a flowchart of method for counsel service according to another embodiment of the present invention, more particularly, method for counsel service provided through the affiliated website. Referring to FIG. 9, after accessing to the affiliated website that provides counsel service by his terminal 700-1, . . . , 700-n (hereinafter, "700"), the counsel user selects desiring counsel service and counselor at step S800. The counselor can be selected by not only the counsel user but also the counsel service management server. Where, the website server that manages the affiliated website may be logically/physically separated from the counsel service management server, or not separated from the counsel service management server. Namely, the counsel service can be provided by one service provider or more than two cooperating service providers.

Through the affiliated website, an affiliated website identifier such as PIN, which is assigned to each affiliated website, a collect call number that the counsel user submits, a counselor identifier indicating who the counsel user selects and a counsel user identifier such as ID of the counsel user are sent to the counsel service management server, and basic information is sent via the counsel service management server or directly to the counselor terminal 730-1, . . . 730-n (hereinafter "730") at step 810. In another embodiment, the affiliated website identifier, the collect call number and the counsel user identifier may be sent to the counselor terminal together with basic information. Of course, a notice indicating there is a counsel request may be sent to the counselor terminal without sending basic information in the bulletin board, and the counselor may read basic information in the bulletin board or download it to his terminal. Although many embodiments can be made by changing the step of providing basic information to the counselor terminal, however, if the counsel user can provide basic information in various forms and the counselor can produce counsel information based on basic information, these embodiments cannot depart from the scope of the present invention.

On receiving the affiliated website identifier, the collect call number, the counselor identifier and the counsel user identifier, the counsel service management server 720 stores them in database, and sends the affiliated website identifier and the collect call number to the counselor terminal 730 corresponding to the counselor identifier at step S820. The counsel service management server 720 may send a counsel request identifier, e.g. a serial number assigned to each counsel request, for distinguishing plural counsel requests of same counsel user to the counselor terminal 730. In another embodiment, if basic information is received from the affiliated website 710, basic information may be sent to the counselor terminal 730, or a notice indicating there is a counsel request may be sent to the counselor terminal 730 and the counselor can acquire basic information after accessing to the counsel service management server 720.

After receiving the affiliated website identifier and the collect call number from the counsel service management server 720 and producing counsel information by analyzing basic information, when the counselor makes a collect call to the provided collect call number, the counselor terminal 730 notifies a start of collect call to the counsel service management server 720 at step S830. It is preferable to hide the collect call number from the counselor and to delete it right after the counselor clicks the call button and the counselor terminal gets connected to the collect call switch. It is for preventing illegal or unauthorized use of personal information by the counselor. On receiving the collect call start notification from the counselor terminal, the counsel service management server 730 stores a call start time relative to the affiliated website identifier, the collect call number, the counselor identifier and the counsel user identifier.

Counselor terminal 730 sends the collect call number to the collect call switch 740 at step S840. By this step, the counselor can communicate with the counsel user in voice via VoIP link formed between counselor terminal 730 and the collect call switch 740. Detailed description of signaling between the collect call switches, the gatekeeper and gateways for call set up/voice call/call release will be omitted here. Since the service provider having the collect call switch performs a billing process actually, it is preferable for the counselor terminal 730 to send the affiliated website identifier and the counselor identifier together with the collect call number to the collect call switch 740. The collect call switch 740 generates CDR including the call start time, a call end time, the collect call number, the affiliated website identifier and the counselor identifier, and stores CDR in billing database. The stored CDR may be used for finding invalid call such as no answered call or abnormally ended call.

The collect call switch 740 forms a voice call link to the collect call number, and if the counsel user accepts the collect call, then connects the counsel user and the counselor over the voice call link at step S850. If the call ends normally, the collect call switch records the call end time, and also the counsel service management server 720 can record the call end time if the counselor terminal 730 notifies the end of collect call.

If the call ends, the counsel service management server 720 and the collect call switch assorts valid calls and invalid calls periodically, generates total call time for each affiliated website and counselor, and distributes counsel service charges based on the predetermined rate.

Figure 10:
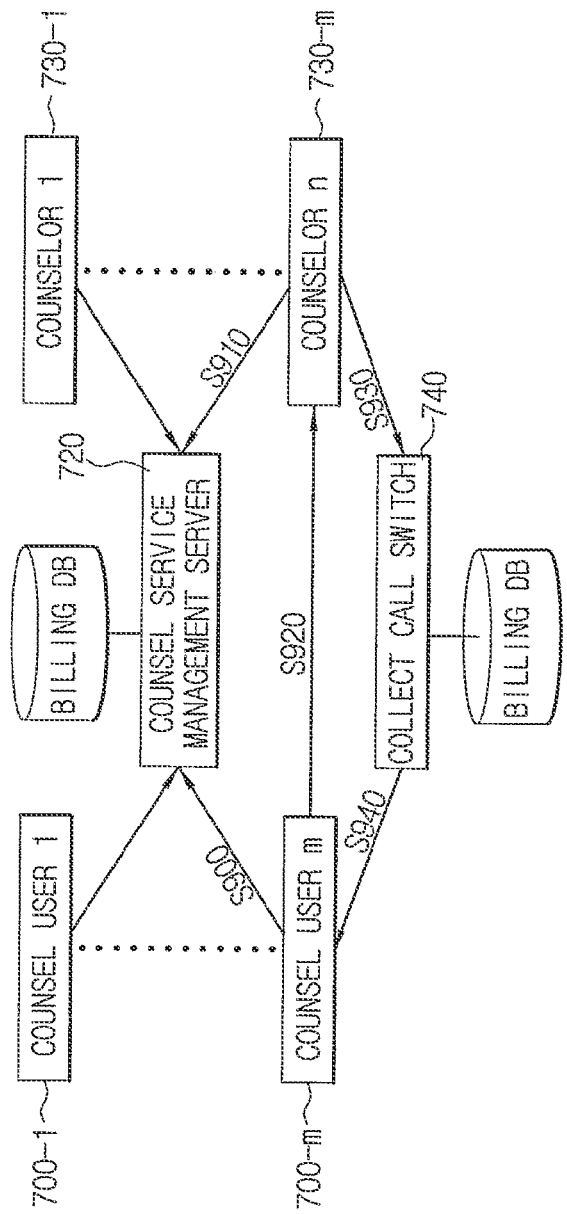
FIG. 10 is a flowchart of method for counsel service according to another embodiment of the invention.

FIG. 10 is a flowchart of method for the counsel service according to another embodiment of the present invention, more particularly, method for the counsel service that the counsel user and the counselor can communicate to each other through an instant messenger or Internet messenger. Hereinafter, difference from the method of FIG. 9 will be mainly described.

When a counsel user logs on a counsel service management server 720 having plural logging counselors, available counsel service list and counselors for each counsel service list are displayed on the counsel user terminal 700 at step S900.

If the counsel user selects a counselor and inputs basic information, basic information is sent to the counselor terminal 730 at step S920. In this embodiment, when the counsel user selects a counselor, a chatting window is displayed on the counsel user terminal and the counselor terminal at the same time, and the counsel user can send basic information by inputting chatting message. Also, if the counsel user selects special kind of counsel service, which requires the counsel user's selection from what the counselor provides, e.g. fortune telling service using Taro card, then a selection window from where the counsel user can make a selection is displayed on the counsel user terminal. The selection made by the counsel user is sent to the counselor terminal 730. Since following steps are same as step S830 to S850 of FIG. 9, detailed description will be omitted here.

In this specification, the method and system for providing collect call service on the VoIP network, which have an effect of reducing toll for collect call, and the method for providing counsel service based on the VoIP collect call system were described with the preferred embodiments. But, it is not intended to limit the scope of the present invention to the aforementioned embodiments. It is apparent to those who skilled in the art that various changes and modifications can be made without departing from the spirits and scope of the present invention. Also, the scope of the present invention will be determined by the following claims.

In one embodiment of the present invention, the caller can use make a voice call on the VoIP network without buying a prepaid card before use, and the uniform toll for collect call, which is determined by only the type and location of called party terminal, is charged to a called party so that the financial burden of called party is reduced. Thus, through this, it is expected that collect call service becomes widely used.

In another embodiment, since access information of the VoIP collect call system of the present invention is opened, so anyone can access to the VoIP collect call system. Because of this point, unauthorized call or hacking call for using the VoIP voice call service cannot happen and hacking to gateway or gatekeeper becomes meaningless.

In another embodiment, since the counsel user does not need to waste the charged counseling time any more, he can receive counsel information at low cost. According to the present invention, the counsel user can further provide basic information freely from the limit of forms before receiving counsel information, more fulfilled counsel service can be expected.

In still another embodiment, since there are no limits that the counselor must provide a counsel service in real time and cannot respond to more than two counsel requests at the same time, the counselor can provide counsel service successively. Also, according to the present invention, since the counselor can receive basic information beforehand, the counselor can provide more fulfilled counsel information and various kinds of counsel service that ARS cannot provide. In still another embodiment, the counsel service provider can provide various kinds of services without buying expensive CTI equipment.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

What is claimed is:

1. A post-paid collect call system based on voice over Internet protocol (VoIP), comprising:
    a calling gateway configured to receive a collect call request, the collect call request generated by a caller telephone, the collect call request including a collect call identifier and a phone number of a called terminal, wherein the calling gateway and caller telephone are included in a VoIP network compatible with one of H.323 Protocol, Session Initiation Protocol (SIP), and Media Gateway Control Protocol (MGCP);
    a called gateway configured to receive the collect call request via the VoIP network; and
    a collect call switch, wherein the collect call switch is in a Public Switched Telephone Network (PTSN), and the collect call switch is configured to:
    a) establish a first communication link only between the collect call switch and the called gateway upon receiving the collect call request from the caller telephone, the first communication link having a first endpoint and a second endpoint, wherein the first endpoint is connected to the collect call switch and the second endpoint is connected to the called gateway;

b) subsequent to establishing the first communication link, establish a second communication link via the PTSN between the collect call switch and the called terminal;

c) transmit a caller identification to the called terminal when the second communication link is established; and d) connect the first communication link and the second communication link based on a collect call acceptance from the called terminal to establish a voice call link between the caller telephone and the called terminal;

wherein the collect call switch is further configured to determine a collect call toll only for the second communication link and to initiate a billing process responsive to the collect call acceptance.

2. The collect call system of claim 1, wherein the collect call switch is further configured to determine the collect call toll only for the second communication link.

3. The collect call system of claim 2, wherein the collect call switch is further configured to determine the collect call toll as the product of i) a unit collect call rate according to a type of the called terminal and ii) a total collect call time.

4. The collect call system of claim 1, wherein the collect call switch is further configured to initiate the billing process responsive to the collect call acceptance.

5. The collect call system of claim 1, wherein the collect call acceptance is in the form of a dual tone multi-frequency (DTMF) signal from the called terminal.

6. The collect call system of claim 1, wherein the collect call request is received from a collect call proxy server configured to authenticate the caller telephone.

7. The collect call system of claim 1, wherein the caller identification is a recording.

8. A post-paid collect call system based on voice over Internet protocol (VoIP), comprising:

a calling gateway configured to receive a collect call request, the collect call request generated by a caller terminal, the collect call request including a collect call identifier and a phone number of a called terminal, wherein the calling gateway and caller terminal are included in a VoIP network compatible with one of H.323 Protocol, Session Initiation Protocol (SIP), and Media Gateway Control Protocol (MGCP);

a called gateway configured to receive the collect call request via the VoIP network; and a collect call switch, wherein the collect call switch is in a Public Switched Telephone Network (PSTN), and the collect call switch is configured to:

a) establish a first communication link having a first endpoint and a second endpoint between the collect call switch and the called gateway upon receiving the collect call request from the caller terminal, wherein the first endpoint is connected to the collect call switch and the second endpoint is connected to the called gateway;

b) subsequent to establishing the first communication link, establish a second communication link via the PSTN between the collect call switch and the called terminal;

c) transmit a collect call announcement to the called terminal when the second communication link is established;

d) subsequent to transmitting the collect call announcement and prior to receiving a collect call acceptance from the called terminal, establish a temporary voice call connection between the caller terminal and the called terminal for purposes of caller identification; and e) subsequent to receiving the collect call acceptance, connect the first communication link and the second communication link to establish a voice call link between the caller terminal and the called terminal for purposes of communication;

wherein the collect call switch is further configured to determine a collect call toll only for the second communication link and to initiate a billing process responsive to the collect call acceptance.

9. A post-paid collect call system based on voice over Internet protocol (VoIP), comprising:

a calling gateway configured to receive a collect call request, the collect call request generated by a caller telephone, the collect call request including a collect call identifier and a phone number of a called terminal, wherein the calling gateway and caller telephone are included in a VoIP network compatible with one of H.323 Protocol, Session Initiation Protocol (SIP), and Media Gateway Control Protocol (MGCP);

a called gateway configured to receive the collect call request via the VoIP network; and a collect call switch, wherein the collect call switch is in a Public Switched Telephone Network (PSTN), and the collect call switch is configured to:

a) establish a first communication link only between the collect call switch and the called gateway upon receiving the collect call request from the caller telephone, the first communication link having a first endpoint and a second endpoint, wherein the first endpoint is connected to the collect call switch and the second endpoint is connected to the called gateway;

b) subsequent to establishing the first communication link, establish a second communication link via the PSTN between the collect call switch and the called terminal;

c) transmit a collect call announcement to the called terminal when the second communication link is established;

d) subsequent to transmitting the collect call announcement and prior to receiving a collect call acceptance from the called terminal, establish a temporary voice call connection between the caller telephone and the called terminal for purposes of caller identification; and e) subsequent to receiving the collect call acceptance, connect the first communication link and the second communication link to establish a voice call link between the caller telephone and the called terminal for purposes of communication;

wherein the collect call switch is further configured to determine a collect call toll only for the second communication link and to initiate a billing process responsive to the collect call acceptance.

10. The collect call system of claim 8, wherein the collect call switch is further configured to determine the collect call toll only for the second communication link.

11. The collect call system of claim 10, wherein the collect call switch is further configured to determine the collect call toll as the product of i) a unit collect call rate according to a type of the called terminal and ii) a total collect call time.

12. The collect call system of claim 8, wherein the collect call switch is further configured to initiate the billing process responsive to the collect call acceptance.

13. The collect call system of claim 8, wherein the collect call acceptance is in the form of a dual tone multi-frequency (DTMF) signal from the called terminal.

14. The collect call system of claim 8, wherein the collect call request is received from a collect call proxy server configured to authenticate the caller telephone.

15. The collect call system of claim 1, wherein the caller identification is a recording.

16. The collect call system of claim 9, wherein the collect call switch is further configured to determine the collect call toll only for the second communication link.

17. The collect call system of claim 16, wherein the collect call switch is further configured to determine the collect call toll as the product of i) a unit collect call rate according to a type of the called terminal and ii) a total collect call time.

18. The collect call system of claim 9, wherein the collect call switch is further configured to initiate the billing process responsive to the collect call acceptance.

19. The collect call system of claim 9, wherein the collect call acceptance is in the form of a dual tone multi-frequency (DTMF) signal from the called terminal.

20. The collect call system of claim 9, wherein the collect call request is received from a collect call proxy server configured to authenticate the caller telephone.

21. The collect call system of claim 9, wherein the caller identification is a recording.

* * * * *

UNITED STATES PATENT AND TRADEMARK OFFICE
CERTIFICATE OF CORRECTION

PATENT NO. : 9,832,321 B2  
APPLICATION NO. : 13/907950  
DATED : November 28, 2017  
INVENTOR(S) : Kwon It is certified that error appears in the above-identified patent and that said Letters Patent is hereby corrected as shown below:

On the Title Page

Item (30), in Column 1, under "Foreign Priority Application Data", delete "Nov. 14, 2003" and insert -- Nov. 14, 2002 --, therefor.

Signed and Sealed this  
Twenty-second Day of May, 2018

Andrei Iancu  
*Director of the United States Patent and Trademark Office*